US010592254B2

(12) United States Patent
Poornachandran et al.

(10) Patent No.: US 10,592,254 B2
(45) Date of Patent: *Mar. 17, 2020

(54) TECHNOLOGIES FOR FAST LOW-POWER STARTUP OF A COMPUTING DEVICE

(71) Applicant: Intel Corporation, Santa Clara, CA (US)

(72) Inventors: Rajesh Poornachandran, Portland, OR (US); Vincent J. Zimmer, Federal Way, WA (US); Karunakara Kotary, Portland, OR (US); Venkatesh Ramamurthy, Hillsboro, OR (US); Pralhad M. Madhavi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 15/695,499

(22) Filed: Sep. 5, 2017

(65) Prior Publication Data

US 2018/0107490 A1 Apr. 19, 2018

Related U.S. Application Data

(63) Continuation of application No. 14/636,970, filed on Mar. 3, 2015, now Pat. No. 9,817,673.

(51) Int. Cl.
*G06F 9/00* (2006.01)
*G06F 15/177* (2006.01)
(Continued)

(52) U.S. Cl.
CPC .......... *G06F 9/4401* (2013.01); *G06F 1/3203* (2013.01); *G06F 1/3212* (2013.01);
(Continued)

(58) Field of Classification Search
CPC .......................................................... G06F 9/44
See application file for complete search history.

(56) References Cited

U.S. PATENT DOCUMENTS

| | | | | |
|---|---|---|---|---|
| 7,046,528 B2* | 5/2006 | Sankman | ................ | H02M 3/00 323/222 |
| 2006/0174246 A1* | 8/2006 | Tamura | ................ | G06F 9/4812 718/100 |

(Continued)

*Primary Examiner* — Mohammed H Rehman
(74) *Attorney, Agent, or Firm* — Barnes & Thornburg LLP

(57) ABSTRACT

Technologies for fast low-power startup include a computing device with a processor having a power management integrated circuit. The computing device initializes platform components into a low-power state and determines, in a pre-boot firmware environment, the battery state of the computing device. The computing device determines a minimum-power startup (MPS) configuration that identifies platform components to be energized and determines whether the battery state is sufficient for the MPS configuration. If sufficient, the computing device energizes the platform components of the MPS configuration and boots into an MPS boot mode. In the MPS boot mode, the computing device may execute one or more user-configured application(s). If the battery state is sufficient for normal operation, the computing device may boot into a normal mode. In the normal mode, the user may configure the MPS configuration by selecting features for the future MPS boot mode. Other embodiments are described and claimed.

20 Claims, 7 Drawing Sheets

(51) Int. Cl.
*G06F 9/4401* (2018.01)
*G06F 1/3203* (2019.01)
*G06F 1/3287* (2019.01)
*G06F 1/3212* (2019.01)

(52) U.S. Cl.
CPC .......... *G06F 1/3287* (2013.01); *Y02D 10/171* (2018.01); *Y02D 10/174* (2018.01); *Y02D 50/20* (2018.01)

(56) References Cited

U.S. PATENT DOCUMENTS

| | | | | |
|---|---|---|---|---|
| 2010/0077240 A1* | 3/2010 | Daga | ...................... | G06F 1/3203 713/320 |
| 2011/0154007 A1* | 6/2011 | Juvonen | ................ | G06F 1/3212 713/2 |

* cited by examiner

```
#define EFI_MIN_POWER_STARTUP_POLICY_GUID \
{ 0xbd8f7aa5, 0xa7f5, 0x46b5, 0x80, 0x7f, 0xb6, 0x58, \
  0x6b, 0xd, 0x2f, 0xaa } typedef struct {
 SCREEN_PROPERTIES          Screen;
 COMMS_CONFIGURATION        Comms;
 GRAPHICS_CONFIGURATION     Gfx;
 PERFORMANCE_CONFIGURATION  Perf;
 UI_ELEMENTS_CONFIGURATION  ui;
 STORAGE_CONFIGURATION      Storage;
 CAMERA_CONFIGURATION       Camera;
} EFI_MIN_POWER_STARTUP_POLICY;
```

TECHNOLOGIES FOR FAST LOW-POWER STARTUP OF A COMPUTING DEVICE

CROSS-REFERENCE TO RELATED U.S. PATENT APPLICATION

This application is a continuation application of U.S. application Ser. No. 14/636,970, entitled "TECHNOLOGIES FOR FAST LOW-POWER STARTUP OF A COMPUTING DEVICE," which was filed on Mar. 3, 2015.

BACKGROUND

Computing devices typically include firmware responsible for hardware initialization, low-level hardware management, and managing the boot process. The main platform firmware responsible for booting the computing device may be implemented according to the Unified Extensible Firmware Interface ("UEFI") specification, which has several versions published by the Unified EFI Forum. The UEFI specification specifies an interface between the firmware of the computing device and the operating system of the computing device. In addition to performing traditional boot and initialization tasks, such drivers and applications may perform other tasks, such as diagnostic, maintenance, or management tasks.

Typical pre-boot firmware executes with all components of the computing device in a fully operational power state (e.g., the "D0" state) without an operating system present to perform active power management. Therefore, powering on a computing device into the firmware may cause a large initial surge in power usage. Thus, battery-powered computing devices typically require some threshold amount of residual charge to be stored in the battery before booting to avoid depleting the battery, destabilizing the system, and in some circumstances damaging the computing device. Before the battery is sufficiently charged to fully boot the computing device, many typical computing devices enter a low-charge mode with no usable capability for the user (e.g., by displaying a "charging" icon or other indicator).

Certain platform firmware—typically legacy BIOS systems—have included "instant on" environments that may be activated instead of booting into a main platform operating system. Those firmware environments were typically simple and optimized for quick boot times, and were thus more popular when typical platform operating systems had longer boot times. Those firmware environments were separate from and otherwise not controlled by the platform operating system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
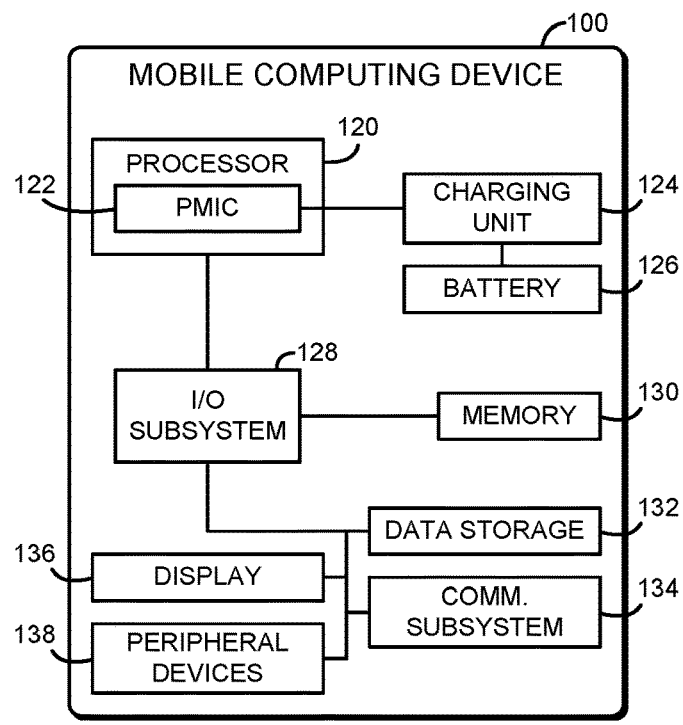
FIG. 1 is a simplified block diagram of at least one embodiment of a computing device for low-power booting.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative mobile computing device 100 for low-power booting includes a processor 120, an I/O subsystem 128, a memory 130, a data storage device 132, and a communications subsystem 134. In use, as described below, the mobile computing device 100 is configured to power on into a pre-boot firmware environment. When powered on, platform components of the processor 120 and/or the mobile computing device 100 such as network radios, graphics devices, embedded controllers, and peripheral devices are initialized into a low-power state, such as a D0i3 standby state. Shortly after powering on, the mobile computing device 100 determines the status of the battery. If the battery level is sufficient for normal boot, the mobile computing device 100 energizes platform components and boots into a full-featured operating system. If the battery level is not sufficient for normal boot, but above a critical threshold level, the mobile computing device 100 may boot into a minimum-power startup (MPS) boot mode. In the MPS boot mode, the mobile computing device 100 energizes a limited number of platform components in order to provide user-selected functionality (e.g., a basic phone calling app). If the battery level increases to be sufficient for normal operation, the mobile computing device 100 may energize remaining platform components and transition to normal operation. Thus, the mobile computing device 100 may provide useable capabilities to a user more quickly when charging from a completely drained battery. Additionally, the MPS boot mode may be under policy control or otherwise integrated with the main platform operating system, which may improve the user experience.

The mobile computing device 100 may be embodied as any type of device capable of low-power booting and otherwise performing the functions described herein. For example, the mobile computing device 100 may be embodied as, without limitation, a laptop computer, a notebook computer, a tablet computer, a smartphone, a wearable computing device, a computer, a multiprocessor system, a consumer electronic device, a smart appliance, and/or any other computing device capable of fast low-power booting. As shown in FIG. 1, the illustrative mobile computing device 100 includes the processor 120, the I/O subsystem 128, the memory 130, and the data storage device 132. Of course, the mobile computing device 100 may include other or additional components, such as a charging unit 124, a battery 126, or other components commonly found in a smartphone (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. The processor 120 includes a power management integrated circuit (PMIC) 122. The PMIC 122 may be embodied as any circuit or collection of circuits capable of dynamically managing power delivery to the processor 120 and/or other components of the mobile computing device 100. For example, the PMIC 122 may support power-gating and/or clock-gating components of the processor 120, dynamic voltage and frequency scaling, thermal sensing and management, and other dynamic power management functions. The PMIC 122 may also manage the battery 126 and the battery charging unit 124 of the mobile computing device 100, and may be capable of managing power delivery from the battery 126, determining the amount of residual charge in the battery 126, and performing other battery management functions. In some embodiments, the processor 120 may include a firmware module or other soft controller capable of programmatically changing the dynamic behavior of power delivery by the PMIC 122. In some embodiments, the power management firmware module may be embodied as a power management unit (PUNIT).

The battery 126 may be embodied as any rechargeable energy storage unit capable of providing energy to the mobile computing device 100. For example, the battery 126 may be embodied as one or more lithium-ion battery cells. The charging unit 124 may be embodied as any controller, circuit, or other component capable of recharging the battery 126, for example by regulating power from an external power source. As described above, the PMIC 122 may manage the charging unit 124 and otherwise control charging of the battery 126.

The memory 130 may be embodied as any type of volatile or non-volatile memory or data storage capable of performing the functions described herein. In operation, the memory 130 may store various data and software used during operation of the mobile computing device 100 such operating systems, applications, programs, libraries, and drivers. The memory 130 is communicatively coupled to the processor 120 via the I/O subsystem 128, which may be embodied as circuitry and/or components to facilitate input/output operations with the processor 120, the memory 130, and other components of the mobile computing device 100. For example, the I/O subsystem 128 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 128 may form a portion of a system-on-a-chip (SoC) and be incorporated, along with the processor 120, the memory 130, and other components of the mobile computing device 100, on a single integrated circuit chip. Additionally, the processor 120 and/or the SoC may include one or more IP cores or other functional blocks that may be individually powered on or off (e.g., communications, graphics, storage, I/O devices, or other functional blocks).

The data storage device 132 may be embodied as any type of device or devices configured for short-term or long-term storage of data such as, for example, memory devices and circuits, memory cards, hard disk drives, solid-state drives, or other data storage devices. The data storage device 132 may store one or more operating systems and/or firmware environments that may be executed by the mobile computing device 100. For example, the data storage device 132 may store a firmware volume as defined by the UEFI specification.

The mobile computing device 100 may also include a communications subsystem 134, which may be embodied as any communication circuit, device, or collection thereof, capable of enabling communications between the mobile computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The mobile computing device 100 may further include a display 136 and one or more peripheral devices 138. The display 136 of the mobile computing device 100 may be embodied as any type of display capable of displaying digital information such as a liquid crystal display (LCD), a light emitting diode (LED), a plasma display, a cathode ray tube (CRT), or other type of display device. The peripheral devices 138 may include any number of additional input/output devices, interface devices, and/or other peripheral devices. For example, in some embodiments, the peripheral devices 138 may include a touch screen, graphics circuitry, an audio device, a microphone, a camera, an environmental sensor, a keyboard, a mouse, and/or other input/output devices, interface devices, and/or peripheral devices.

Figure 2:
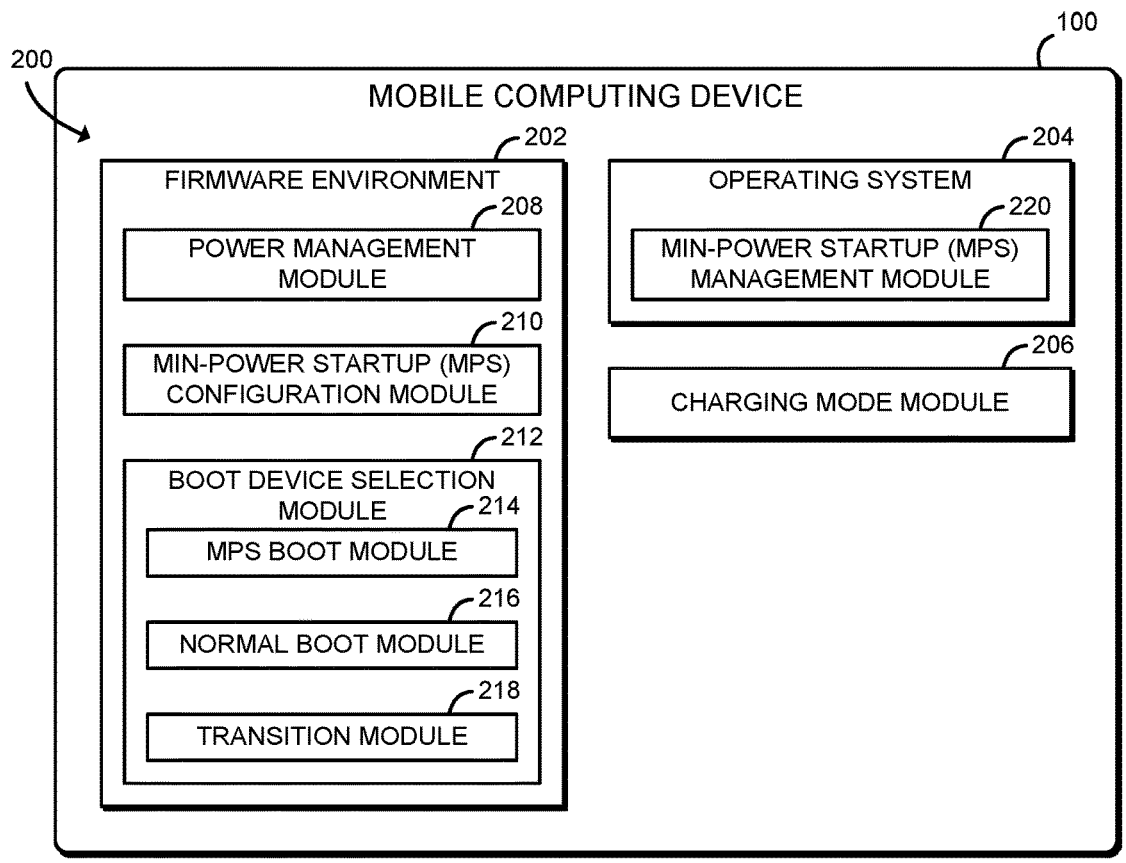
FIG. 2 is a simplified block diagram of at least one embodiment of an environment of the computing device of FIG. 1.

Referring now to FIG. 2, in the illustrative embodiment, the mobile computing device 100 establishes an environment 200 during operation. The illustrative embodiment 200 includes a firmware environment 202, an operating system 204, and a charging mode module 206. The firmware environment 202 further includes a power management module 208, a minimum-power startup (MPS) configuration module 210, and a boot device selection module 212. The operating system 204 includes an MPS management module 220. The various modules of the environment 200 may be embodied as hardware, firmware, software, or a combination thereof. For example the various modules, logic, and other components of the environment 200 may form a portion of, or otherwise be established by, the processor 120 or other hardware components of the mobile computing device 100. As such, in some embodiments, any one or more of the modules of the environment 200 may be embodied as a circuit or collection of electrical devices (e.g., a power management circuit, an MPS configuration circuit, etc.).

The firmware environment 202 may be embodied as any pre-boot firmware environment that initializes and configures components of the mobile computing device 100 prior to passing control of the mobile computing device 100 to the operating system 204. For example, the firmware environment 202 may be embodied as a UEFI-compliant firmware environment.

The power management module 208 is configured to initialize or transition components of the mobile computing device 100 in a low-power state such as a device standby power state (e.g., the D0i3 standby, inactive state). The power management module 208 is also configured to determine the battery state of the mobile computing device 100, such as a voltage or other indication of the level of charge of the battery 126. The power management module 208 may interface with the PMIC 122 and/or other firmware devices of the mobile computing device 100 to determine the battery state.

The MPS configuration module 210 is configured to determine a minimum-power startup (MPS) configuration that identifies one or more components of the mobile computing device 100 that should be powered on in the MPS boot mode. The MPS configuration module 210 is further configured to determine whether the current battery state is sufficient for the minimum-power startup configuration or for normal startup; that is, whether the battery 126 has sufficient energy to power the components of the mobile computing device 100 active in the MPS boot mode or the normal boot mode, respectively. The MPS configuration module 210 is further configured to expose the current configuration of the mobile computing device 100 to the operating system 204, for example by exporting a list of powered-on platform components as one or more firmware tables.

The boot device selection module 212 is configured to boot the computing device in the minimum-power startup (MPS) boot mode if the battery state is sufficient for the minimum-power startup configuration or in the normal boot mode if the battery state is sufficient for normal boot. When booting in the MPS boot mode, the boot device selection module 212 is configured to selectively energize one or more components of the mobile computing device 100 based on the minimum-power startup configuration. The boot device selection module 212 may be configured to start a user-specified application in the MPS boot mode with functionality based on the MPS configuration. When booting in the normal boot mode, the boot device selection module 212 may be configured to energize all components of the mobile computing device 100. In some embodiments, the boot device selection module 212 may be configured to transition from the MPS boot mode to the normal boot mode, for example by energizing any remaining components of the mobile computing device 100 if the battery level becomes sufficient for normal boot. In some embodiments, those functions may be performed by one or more sub-modules, such as an MPS boot module 214, a normal boot module 216, and/or a transition module 218.

The operating system 204 may be embodied as any operating system, guest operating system, hypervisor, virtual machine monitor, or other control structure of the mobile computing device 100. The operating system 204 takes control of the mobile computing device 100 after the firmware environment 202 terminates boot services. The operating system 204 may access certain runtime firmware services provided by the firmware environment 202, for example managing platform firmware variables. The operating system 204 may enable or disable certain applications, device drivers, and/or other features based on the currently active components of the mobile computing device 100. For example, the operating system 204 may enable or disable an application, device, or other functionality based on one or more MPS configuration tables exposed by the firmware environment 202.

The MPS management module 220 is configured to receive a user selection of a feature to be activated in the minimum-power startup (MPS) boot mode. For example, a user may select a telephony feature (e.g., emergency calling or voice calling), a messaging feature (e.g. SMS messaging), an application (e.g. a phone app), or other feature. The MPS management module 220 is configured to determine the minimum-power startup configuration for the mobile computing device 100 based on the user-selected feature. The MPS management module 220 may be configured to save the minimum-power startup configuration as a firmware variable. In some embodiments, the MPS management module 220 may be configured to store a display image that may be shown on the display 136 in the MPS boot mode.

The charging mode module 206 is configured to disable the mobile computing device 100 if the battery state is not sufficient for normal boot or for the minimum-power startup configuration. The charging mode module 206 may determine whether the battery 126 of the mobile computing device 100 is currently being charged. If the battery 126 is charging, the charging mode module 206 may be configured to boot into charging OS or other charging mode that provides limited or no usable capability for the user. If the battery 126 is not charging, the charging mode module 206 may be configured to power down the mobile computing device 100.

Figure 3:
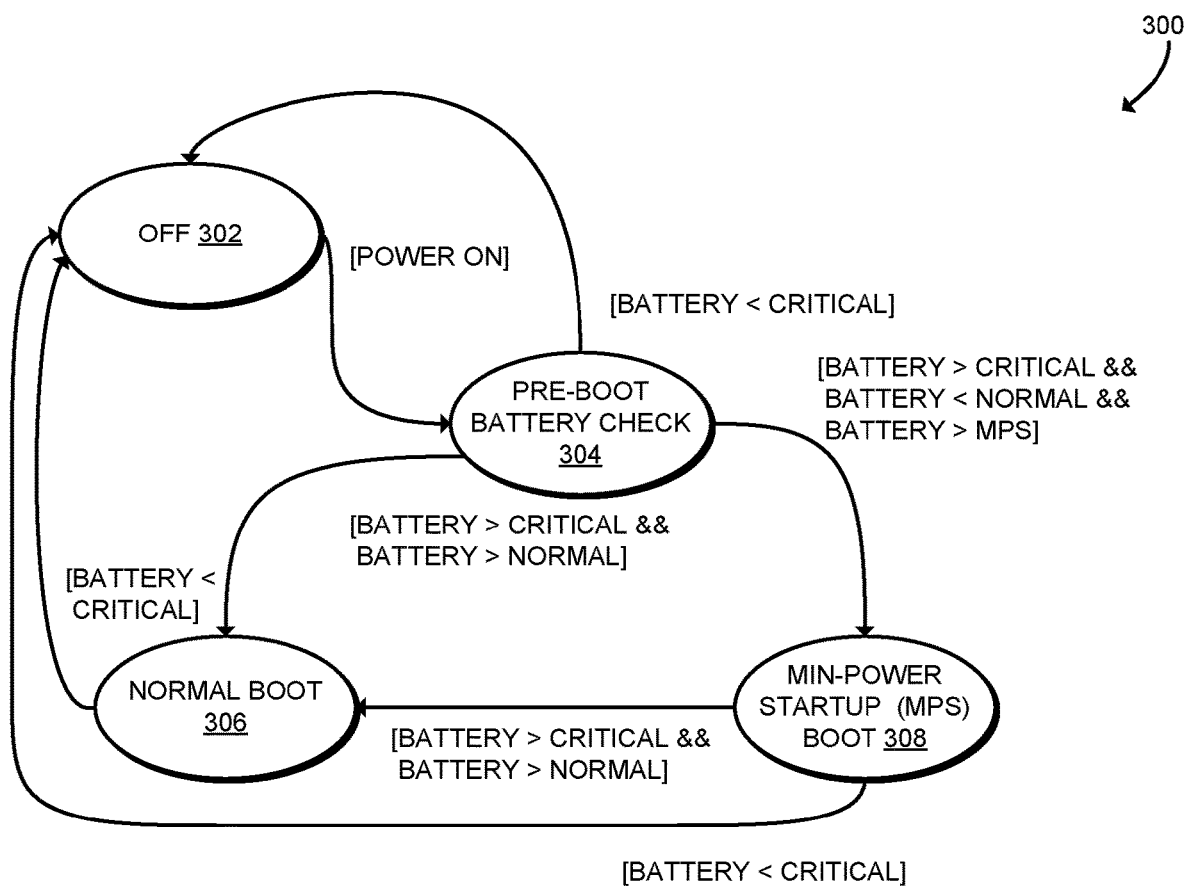
FIG. 3 is a simplified state transition diagram of at least one embodiment of a method for low-power startup that may be executed by the computing device of FIGS. 1 and 2.

Referring now to FIG. 3, in use, the mobile computing device 100 may execute a method for low-power booting illustrated by the state transition diagram 300. The mobile computing device 100 starts in an off state 302. In the off state 302, the mobile computing device 100 may be completely powered off or may be in a "soft-off" or charging state. In the off state 302, the mobile computing device 100 has limited or no user functionality. After powering on, the mobile computing device 100 transitions to a pre-boot battery check state 304. In the pre-boot battery check state 304, the mobile computing device 100 determines the current energy level of the battery 126, for example using the PMIC 122 of the processor 120. The pre-boot battery check state 304 may execute in an early pre-boot firmware environment, for example in a pre-EFI initialization (PEI) phase. If the battery level is below a critical threshold, the mobile computing device 100 transitions back to the off state 302.

If the battery level is above the critical level and above a threshold level required for full-power operation, the mobile computing device 100 transitions from the pre-boot battery check state 304 to a normal boot state 306. In the normal boot state 306, the mobile computing device 100 may energize all components (or a normal, full-featured selection of components) and boot into the operating system 204. In the normal boot state 306, the mobile computing device 100 may provide full feature and device support to the user. If the battery level drops below the critical level, the mobile computing device 100 may transition from the normal boot state 306 to the off state 302.

If the battery level is above the critical level, below the threshold level required for full-power operation, and above a threshold level required for minimum-power startup (MPS) mode, the mobile computing device 100 transitions from the pre-boot battery check state 304 to a minimum-powers startup (MPS) boot state 308. In the MPS boot state 308, the mobile computing device 100 may selectively energize some components to provide specified features to the user. For example, the mobile computing device 100 may activate functionality for a basic phone app but power down more advanced functionality (e.g. advanced graphics or networking). Thus, in the MPS boot state 308, the mobile computing device 100 may provide limited feature and device support to the user. If the battery level increases above the threshold level required for full-power operation, the mobile computing device 100 may transition from the MPS boot state 308 to the normal boot state 306. If the battery level decreases below the critical level, the mobile computing device 100 may transition from the MPS boot state 308 to the off state 302.

Figure 4:
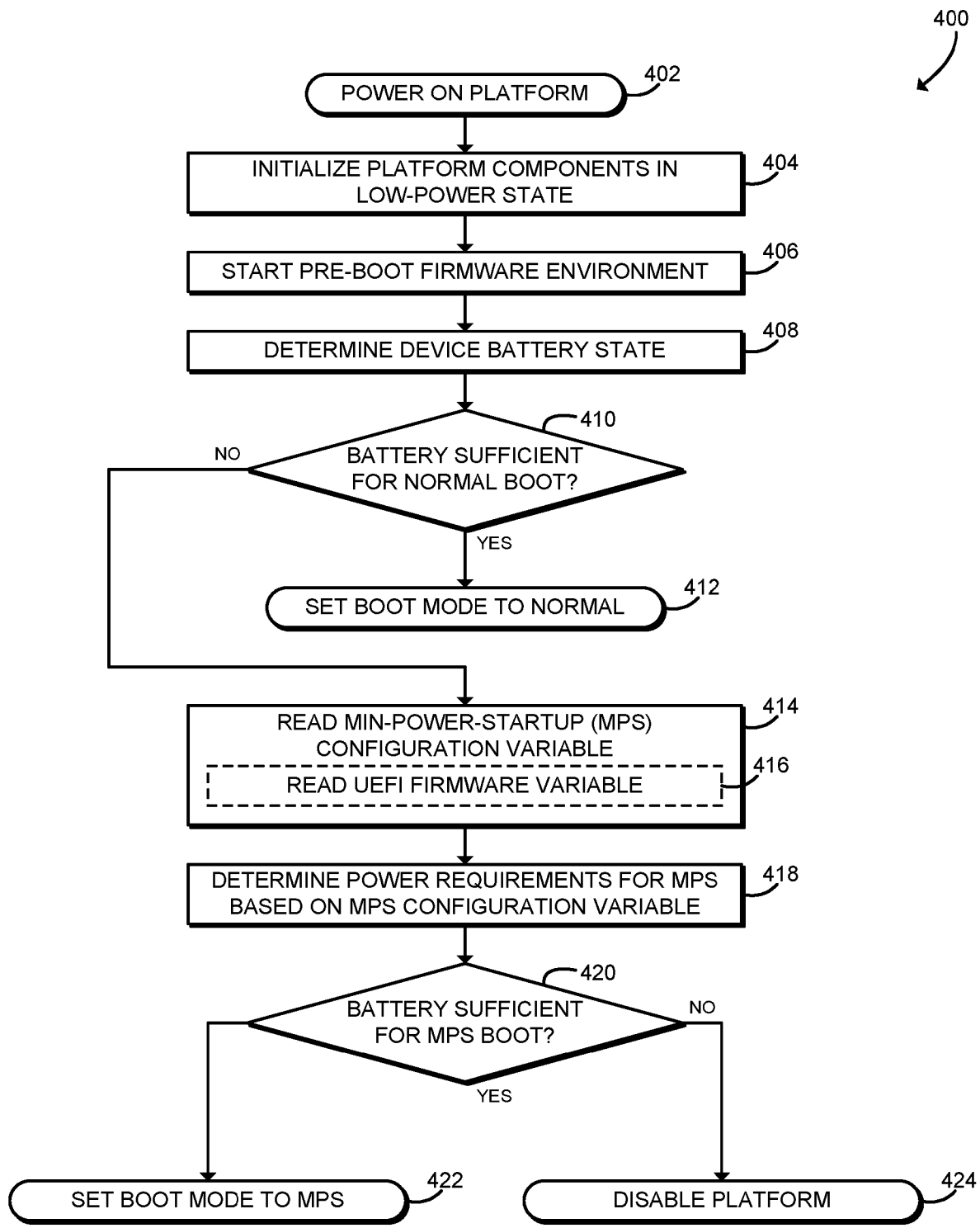
FIG. 4 is a simplified flow diagram of at least one embodiment of a method for low-power startup that may be executed by the computing device of FIGS. 1 and 2.

Referring now to FIG. 4, in use, the mobile computing device 100 may execute a method 400 for low-power booting. The method 400 may be executed by the mobile computing device 100, for example, when transitioning out of the off state 302 as described above in connection with FIG. 3. The method 400 begins in block 402, in which the mobile computing device 100 powers on. The mobile computing device 100 may power on, for example, in response to a user command such as a button press, in response to being connected to an external power supply, or in response to any other appropriate event.

In block 404, the mobile computing device 100 initializes platform components of the mobile computing device 100 in a low-power state. For example, the mobile computing device 100 may initialize the platform components in a device standby state such as D0i3. In some embodiments, the mobile computing device 100 may initialize components that are not required to execute firmware, such as, for example, the I/O subsystem 128, the memory 130, the data storage device 132, the communications subsystem 134, the display 136, and/or the peripheral devices 138 in the low-power state.

In block 406, the mobile computing device 100 starts a pre-boot firmware environment. The pre-boot firmware environment may be embodied as an early firmware initialization phase. In some embodiments, the pre-boot firmware environment may be executed by the processor 120 without using additional components of the mobile computing device 100, for example using on-processor resources of the processor 120 instead of the memory 130. In the pre-boot firmware environment, the mobile computing device 100 may execute one or more drivers, modules, or other executable code to perform device initialization. For example, the pre-boot firmware environment may be embodied as a pre-EFI initialization (PEI) phase.

In block 408, the mobile computing device 100 determines the battery state of the mobile computing device 100. The mobile computing device 100 may determine a voltage value, current value, or other indication of the amount of energy stored by the battery 126. The mobile computing device 100 may determine the battery state by communicating with the PMIC 122 of the processor 120.

In block 410, the mobile computing device 100 determines whether the battery level is sufficient for a normal boot process. The mobile computing device 100 may determine, for example, whether the battery level exceeds a predefined threshold. As another example, the PMIC 122 may determine, based on the current battery state and the current charging rate, what components of the processor 120 and/or the mobile computing device 100 may be powered on without compromising the mobile computing device 100. If all components (or a normal, full-featured selection of components) may be powered on, the battery level may be sufficient for a normal boot process. If the battery level is not sufficient, the method 400 branches to block 414, described below. If the battery level is sufficient for normal boot, the method 400 advances to block 412, in which the mobile computing device 100 sets the boot mode to normal. After setting the boot mode to normal, the mobile computing device 100 may execute later firmware phases and/or the operating system 204 in a normal, full-featured boot mode. One embodiment of a method for the normal boot mode is described below in connection with FIG. 7.

Referring back to block 410, if the battery level is not sufficient for normal boot, the method 400 branches to block 414. In block 414, the mobile computing device 100 reads a minimum-power startup (MPS) configuration variable. The MPS configuration variable may define platform components of the processor 120 and/or the mobile computing device 100 that are to be powered on in the MPS boot mode. In some embodiments, the MPS configuration variable may also define power management configurations for the platform components. In some embodiments, in block 416, the mobile computing device 100 may read a UEFI firmware variable that includes or otherwise specifies the MPS configuration variable.

Figures 5, 6:
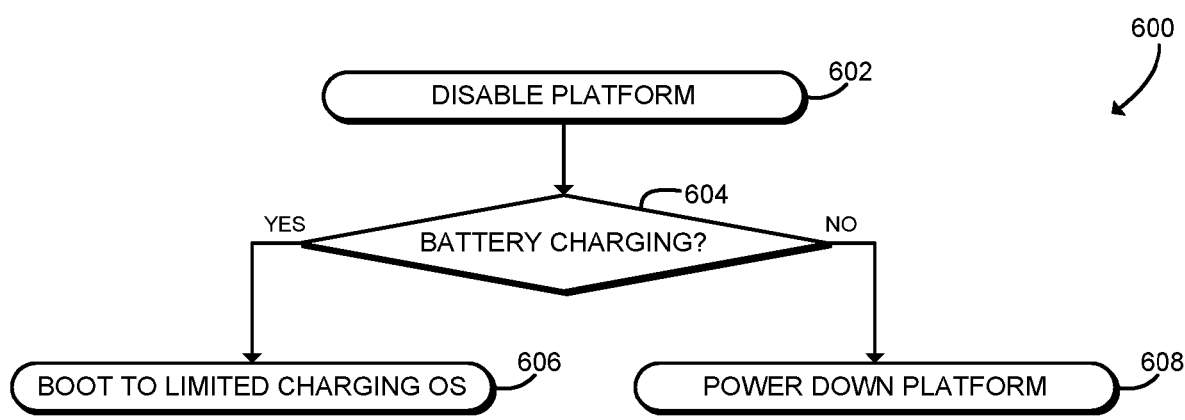
FIG. 5 is pseudocode illustrating at least one embodiment of a minimum-power startup configuration variable that may be used by the computing device of FIGS. 1 and 2.
FIG. 6 is a simplified flow diagram of at least one embodiment of a method for disabling the platform that may be executed by the computing device of FIGS. 1 and 2.

For example, referring now to FIG. 5, pseudocode 500 illustrates at least one potential embodiment of the MPS configuration variable. As shown, the MPS configuration variable may be embodied as an EFI_MIN_POWER_STARTUP_POLICY structure. Each member of the structure may be embodied as a Boolean value, bitmap, or other value indicating a power management configuration. For example, the Screen member may define a smaller size for graphics on the display 136. For some display technologies, such as OLED panels, power consumption may be reduced by displaying images on only part of the display 136. As another example, the Comms member may indicate whether to enable certain features of the communications subsystem 134 (e.g., whether to enable certain radios such as Bluetooth®, GPS, Wi-Fi®, 3G, and/or 4G LTE). The Gfx member may indicate whether to enable certain graphics processing features such as 3-D graphics acceleration, video encoding, or video decoding features. The Perf member may define performance parameters for components of the mobile computing device 100. For example, the Perf member may define maximum operating frequencies for the processor 120 and/or the memory 130, or may disable one or more processor cores and/or processors 120. The ui member may indicate whether to enable certain user interaction modes such as voice interaction and/or certain peripheral devices 138 such as sensor hubs, user input devices, and/or environmental sensors. The Storage member may indicate whether to enable the data storage device 132 and/or other data storage components. The Camera member may indicate whether to enable a digital camera, image signal processor block, and/or other camera components of the mobile computing device 100.

Referring back to FIG. 4, in block 418, the mobile computing device 100 determines power requirements for the MPS boot mode based on the MPS configuration variable. The mobile computing device 100 may determine the power required to activate the components defined by the MPS configuration variable and/or the power required to activate the power management configuration defined by the MPS configuration variable. In block 420, the mobile computing device 100 determines whether the current battery state is sufficient for the MPS boot mode. The mobile computing device 100 may determine what components of the processor 120 and/or the mobile computing device 100 may be powered on without compromising the mobile computing device 100 based on the current battery state and the current charging rate as determined using the PMIC 122. If the component and/or power management configuration specified by MPS configuration variable may be powered on, the battery level may be sufficient for the MPS boot process. If the battery level is not sufficient, the method 400 branches to block 424, described below. If the battery level is sufficient for the MPS boot mode, the method 400 branches to block 422.

In block 422, the mobile computing device 100 sets the boot mode to the MPS boot mode. After setting the boot mode to MPS, the mobile computing device 100 may execute later firmware phases and/or the operating system 204 in the MPS boot mode. The MPS boot mode may activate a reduced set of features or devices as specified by the MPS configuration variable. One embodiment of a method for the MPS boot mode is described below in connection with FIG. 8. Although illustrated as selecting a single MPS boot mode with a single MPS configuration, it should be understood that in some embodiments, the mobile computing device 100 may support multiple MPS configurations. For example, multiple MPS configurations may each be associated with different battery thresholds and selected at boot time based on the residual battery level.

Referring back to block 420, if the battery level is not sufficient for the MPS boot mode, the method 400 branches to block 424, in which the mobile computing device 100 disables the platform. The mobile computing device 100 may, for example, power down the platform or enter a charging mode if connected to an external power source. One embodiment of a method for disabling the platform is described below in connection with FIG. 6. Additionally or alternatively, in some embodiments, rather than disabling the platform, the mobile computing device 100 may wait in the block 420 until the battery level is sufficient for the MPS boot mode and then branch to the block 422 as described above.

Referring now to FIG. 6, the mobile computing device 100 may execute a method 600 for disabling the platform. The method 600 may be executed by the mobile computing device 100, for example, when transitioning into the off state 302 as described above in connection with FIG. 3. The method 600 begins in block 602, in which the mobile computing device 100 begins to disable the platform. The mobile computing device 100 may disable the platform, for example, when the battery level is below a predefined critical level. The platform may be disabled during execution of a pre-boot firmware environment as described above in connection with FIG. 4, or when executing in the normal boot mode or the MPS boot mode as described below in connection with FIGS. 7-8.

In block 604, the mobile computing device 100 determines whether the battery 126 is charging, for example using the PMIC 122. If the battery 126 is charging, the method 600 branches to block 606, in which the mobile computing device 100 boots into a charging operating system (OS) and/or other charging mode. The charging OS may provide no usable capabilities for the user. For example, the charging OS may display a charging icon or other indicator, but may not allow the user to launch applications, place phone calls, or otherwise use the mobile computing device 100. Referring back to block 604, if the battery 126 is not charging, the method 600 branches to block 608, in which the mobile computing device 100 powers down the platform. For example, the mobile computing device 100 may enter an off state, a soft-off state, a hibernate state, or other minimal power usage state.

Figure 7:
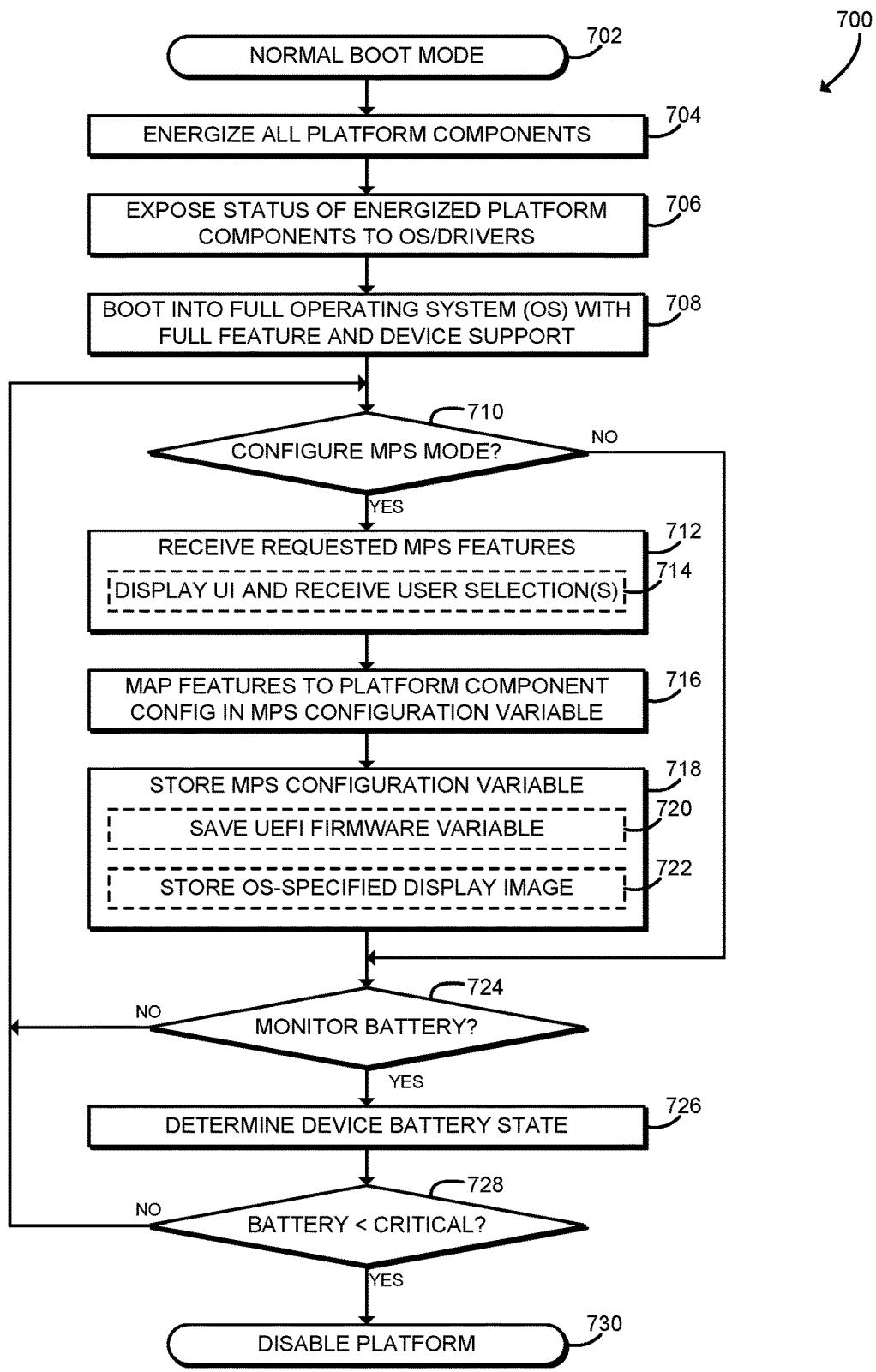
FIG. 7 is a simplified flow diagram of at least one embodiment of a method for a normal boot mode that may be executed by the computing device of FIGS. 1 and 2.

Referring now to FIG. 7, the mobile computing device 100 may execute a method 700 for the normal boot mode. The method 700 may be executed by the mobile computing device 100, for example, when transitioning into the normal boot state 306 as described above in connection with FIG. 3. The method 700 begins in block 702, in which the mobile computing device 100 starts the normal boot mode. As described above, the normal boot mode may be started if the battery state of the mobile computing device 100 is above a critical level and sufficient for the normal boot mode. The method 700 may begin execution in a pre-boot firmware environment such as a pre-EFI initialization (PEI) phase or a driver execution environment (DXE) phase.

In block 704, the mobile computing device 100 may energize all platform components of the mobile computing device 100 or a normal selection of components required for full-featured use of the mobile computing device 100. For example, the mobile computing device 100 may energize the I/O subsystem 128, the memory 130, the data storage device 132, the communications subsystem 134, the display 136, and/or the peripheral devices 138. The mobile computing device 100 may also configure components of the mobile computing device 100 for full-power operation. For example the mobile computing device 100 may configure the processor 120 and/or the memory 130 for full-frequency operation, may enable various radios of the communications subsystem 134 (e.g., Bluetooth®, GPS, Wi-Fi®, and/or 4G LTE radios), may enable graphical output on the entire display 136, and/or may enable various user input devices or other peripheral devices 138. In block 706, the mobile computing device 100 may expose the status of the energized platform components for use by code modules such as the operating system 204 and/or firmware drivers. For example, the mobile computing device 100 may include the power status of components of the mobile computing device 100 in one or more firmware tables or other data structures accessible to the operating system 204, firmware drivers, and/or other code modules of the mobile computing device 100.

In block 708, the mobile computing device 100 boots into the operating system 204. For example, the mobile computing device 100 may execute one or more operating system loaders in the firmware environment 202 and then transition into operation of the operating system 204. The operating system 204 may boot into a full-featured mode, load appropriate feature modules, or otherwise allow the user to access all features and devices of the mobile computing device 100. After booting the operating system 204, the mobile computing device 100 may execute operating system and/or application code as directed by the user.

In block 710, the mobile computing device 100 determines whether to configure the MPS boot mode. The mobile computing device 100 may configure the MPS boot mode in response to a user command such as loading a management application, control panel, management console, or other administrative tool of the mobile computing device 100. If not configuring the MPS mode, the method 700 branches ahead to block 724, described below. If the mobile computing device 100 determines to configure the MPS mode, the method 700 advances to block 712.

In block 712, the mobile computing device 100 receives one or more requested features for the MPS boot mode from the user. The requested features may be embodied as telephony features, messaging features, network features, requested applications, or any other desired capability specified by the user. For example, the user may request a basic phone calling app in the MPS boot mode. In some embodiments, in block 714, the mobile computing device 100 may display a user interface and receive the requested features through the user interface.

In block 716, the mobile computing device 100 maps the requested features to a platform component configuration expressed by the MPS configuration variable. For example, the mobile computing device 100 may determine the components of the processor 120 and/or the mobile computing device 100 required to execute the requested application or otherwise perform the requested features. As an illustration, the user may select phone functionality, for example by selecting phone functionality or requesting the phone app. The mobile computing device 100 may determine, for example, that the requested functionality requires a 3G voice calling capability to be enabled, but that other radios of the communications subsystem 134 (e.g., Bluetooth®, GPS, Wi-Fi®, and/or 4G LTE radios) may be powered down. As another example, the mobile computing device 100 may determine that a reduced area of the display 136 may be used to display a basic phone app or that the processor 120 and/or the memory 130 may execute the basic phone app with reduced performance.

In block 718, the mobile computing device 100 stores the MPS configuration variable to be used during the MPS boot mode. The mobile computing device 100 may store the MPS configuration variable in any data format and/or storage location accessible to the platform firmware 202. For example, in some embodiments in block 720, the mobile computing device 100 may save the MPS configuration variable as a UEFI firmware variable. Additionally or alternatively, in some embodiments in block 722, the mobile computing device 100 may store a display image specified by the operating system 204. The display image may be stored in any location accessible to the firmware environment 202, for example in a firmware volume of the data storage device 132. The display image may be shown on the display 136 during the MPS boot mode, for example to provide a visual interface consistent with the operating system 204. After storing the MPS configuration variable, the method 700 advances to block 724.

In block 724, the mobile computing device 100 determines whether to continually monitor the battery state during runtime execution of the operating system 204. The battery 126 may be monitored by, for example, a resident runtime firmware service of the firmware environment 202, by a device driver or other component of the operating system 204, by the PMIC 122, and/or by any other power management component of the mobile computing device 100. The mobile computing device 100 may determine whether to monitor the battery level based on whether a monitoring capability is available, whether monitoring is specified by platform policy, and/or based on other appropriate criteria. If the mobile computing device 100 determines not to monitor the battery state, the method 700 loops back to block 710 to continue determining whether to configure the MPS configuration variable. If the mobile computing device 100 determines to monitor the battery state, the method 700 advances to block 726.

In block 726, the mobile computing device 100 determines the battery state of the mobile computing device 100. Similar to the determination in the pre-boot firmware described above in connection with block 408, the mobile computing device 100 may determine a voltage value, current value, or other indication of the amount of energy stored by the battery 126. The mobile computing device 100 may determine the battery state by communicating with the PMIC 122 of the processor 120.

In block 728, the mobile computing device 100 determines whether the battery state is below a critical level. The mobile computing device 100 may determine, for example, whether the battery is below a predefined charge level. If the battery level is below the critical level, the method 700 advances to block 730, in which the mobile computing device 100 disables the platform. The mobile computing device 100 may, for example, power down the platform or enter a charging mode. One embodiment of a method for disabling the platform is described above in connection with FIG. 6. Referring back to block 728, if the battery level is not below the critical level, the method 700 loops back to block 710 to continue determining whether to configure the MPS configuration variable.

Figure 8:
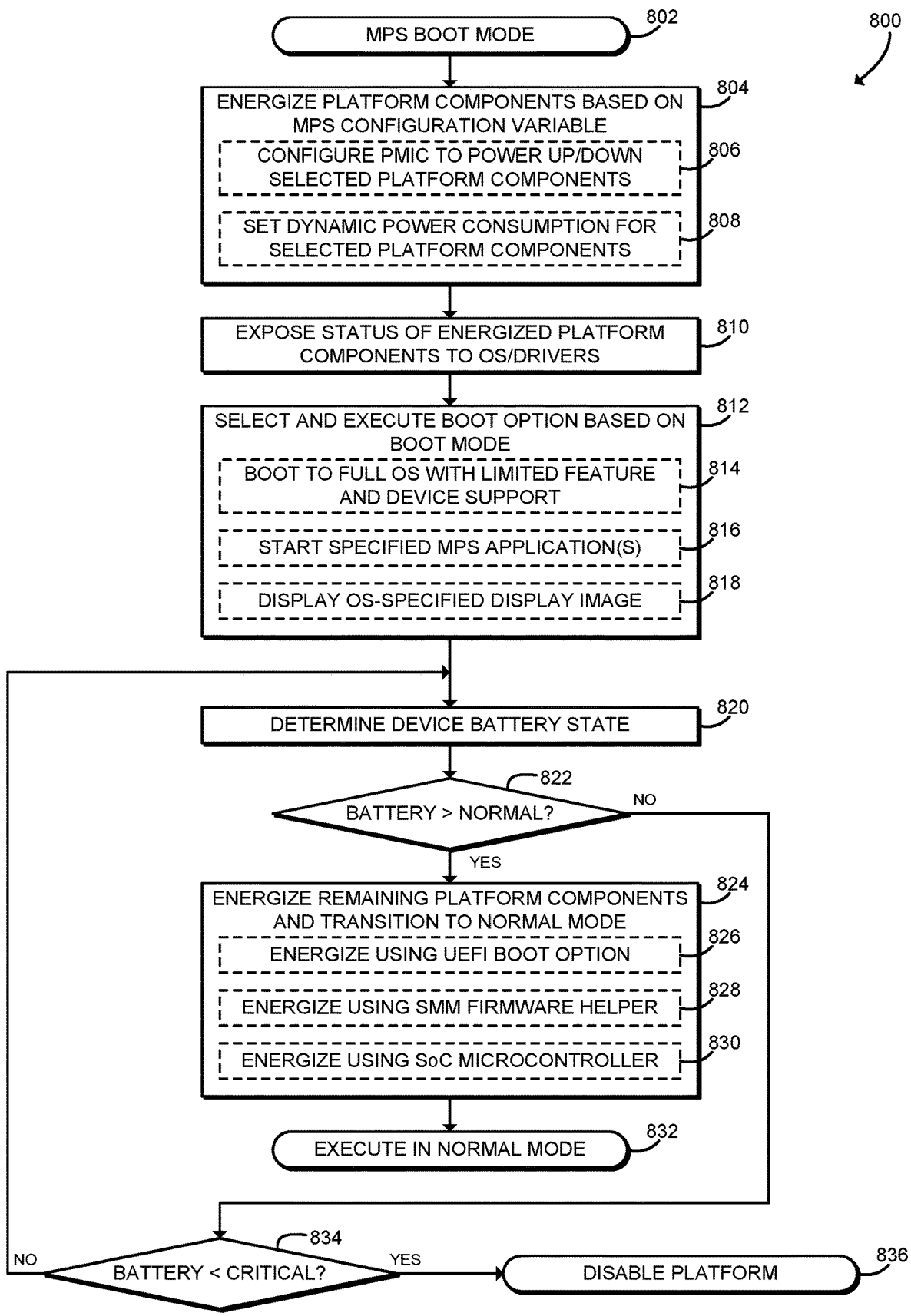
FIG. 8 is a simplified flow diagram of at least one embodiment of a method for a minimum-power startup boot mode that may be executed by the computing device of FIGS. 1 and 2.

Referring now to FIG. 8, the mobile computing device 100 may execute a method 800 for the minimum-power startup (MPS) boot mode. The method 800 may be executed by the mobile computing device 100, for example, when transitioning into the MPS boot state 308 as described above in connection with FIG. 3. The method 800 begins in block 802, in which the mobile computing device 100 starts the MPS boot mode. As described above, the MPS boot mode may be started if the battery state of the mobile computing device 100 is above a critical level, not sufficient for the normal boot, and sufficient for the MPS boot. The method 800 may begin execution in a pre-boot firmware environment such as a pre-EFI initialization (PEI) phase or a driver execution environment (DXE) phase.

In block 804, the mobile computing device 100 energizes platform components of the mobile computing device 100 based on the MPS configuration variable. The mobile computing device 100 may energize the platform components by, for example, bringing them from the D0i3 standby state to the D0i0 active state. As described above, the MPS configuration variable may define platform components of the processor 120 and/or the mobile computing device 100 that are to be powered on in the MPS boot mode, and may define power management configurations of the platform components. In some embodiments, in block 806 the mobile computing device 100 may configure the PMIC 122 to power up and/or down selected platform components based on the MPS configuration variable. In some embodiments, the mobile computing device 100 may program a PUNIT or otherwise programmatically command the PMIC 122 to power up and/or down the specified components. For example, the mobile computing device 100 may activate and/or deactivate certain radios of the communications subsystem 134 (e.g., Bluetooth® GPS, Wi-Fi®, 4G LTE, and/or 3G). As another example, the mobile computing device 100 may activate and/or deactivate certain functional blocks of the processor 120 and/or the mobile computing device 100 such as one or more processor cores, processor graphics, graphics controllers, network controllers, or peripheral controllers such as camera controllers or sensor hubs. In some embodiments, in block 808 the mobile computing device 100 may set the dynamic power consumption of components of the mobile computing device 100. For example, the mobile computing device 100 may set the frequency of the processor 120 and/or the memory 130 or may set the brightness and/or viewable display area of the display 136.

In block 810, the mobile computing device 100 may expose the status of the energized platform components for use by code modules such as the operating system 204 and/or firmware drivers. For example, the mobile computing device 100 may include the power status of components of the mobile computing device 100 in one or more firmware tables or other data structures accessible to the operating system 204, firmware drivers, and/or other code modules of the mobile computing device 100.

In block 812, the mobile computing device 100 selects and executes a boot option based on the boot mode. For example, in some embodiments the mobile computing device 100 may execute a boot option that has been predefined or otherwise configured for the MPS boot mode. The boot options may be embodied as one or more firmware applications, operating system loaders, and/or other executable code. In some embodiments, in block 814, the mobile computing device 100 may boot to the operating system 204. The operating system 204 may support operating in a reduced-functionality mode, load appropriate feature modules, or otherwise allow the user to access a limited set of features and devices of the mobile computing device 100 that have been enabled in the MPS boot mode. In some embodiments, in block 816 the mobile computing device 100 may start one or more user-specified applications in the MPS boot mode. For example, the user may request that a basic phone app execute in the MPS boot mode. The MPS boot mode applications may be embodied as firmware applications executing in the firmware environment 202 or, in some embodiments, applications executed by the operating system 204. In some embodiments, in block 818 the mobile computing device 100 may show a display image on the display 136 that has been specified by the operating system 204. For example, a firmware application executing in the firmware environment 202 may display a graphical interface provided by the operating system 204, allowing the MPS boot mode application to be visually consistent with the operating system 204.

In block 820, the mobile computing device 100 determines the battery state of the mobile computing device 100. Similar to the determination in the pre-boot firmware described above in connection with block 408, the mobile computing device 100 may determine a voltage value, current value, or other indication of the amount of energy stored by the battery 126. The mobile computing device 100 may determine the battery state by communicating with the PMIC 122 of the processor 120. The mobile computing device 100 may determine the battery state of the mobile computing device 100 while executing one or more applications in the MPS boot mode.

In block 822, the mobile computing device 100 determines whether the battery level is sufficient for normal operation. The mobile computing device 100 may determine, for example, whether the battery level exceeds a predefined threshold. As another example, the PMIC 122 may determine, based on the current battery state and the current charging rate, what components of the processor 120 and/or the mobile computing device 100 may be powered on without compromising the mobile computing device 100. If all components (or a normal, full-featured selection of components) may be powered on, the battery level may be sufficient for normal operation. If the battery level is not sufficient, the method 800 branches to block 834, as described below. If the battery level is sufficient for normal operation, the method 800 advances to block 824.

In block 824, the mobile computing device 100 energizes remaining platform components of the mobile computing device 100 and transitions out of the MPS boot mode into normal operation. The mobile computing device 100 may use any technique to transition to normal mode. For example, in some embodiments, the mobile computing device 100 may present a user interface option or otherwise allow the user to command the mobile computing device 100 to enter normal operation. Additionally or alternatively, in some embodiments the mobile computing device 100 may enter normal operation without requiring additional user interaction.

In some embodiments, in block 826, the mobile computing device 100 may energize the remaining components using the UEFI boot option executed as described above in connection with block 812. For example, in some embodiments the operating system 204 itself may energize platform components and enable feature and device support. Additionally or alternatively, in some embodiments a firmware driver and/or firmware application may energize the platform components and then invoke the operating system 204. In some embodiments, in block 828, the mobile computing device 100 may energize the remaining platform components using a system management mode (SMM) firmware helper. The SMM firmware helper may, for example, program the PMIC 122 to remove power-gating and other inhibitions from the platform components. Upon resume from the SMM firmware helper, the operating system 204 may detect and enable the active components, without requiring a reboot of the mobile computing device 100. Additionally or alternatively, in some embodiments, in block 830 the remaining platform components may be energized by an embedded microcontroller of the processor 120 and/or the mobile computing device 100 such as the PMIC 122, the PUNIT, or a converged security and manageability engine (CSME). In those embodiments, the remaining components may be energized transparently to the processor 120 and/or firmware executed by the processor 120.

After energizing the remaining platform components, in block 832 the mobile computing device 100 executes in a normal mode. The mobile computing device 100 may, for example, set the boot mode to normal, execute the operating system 204, and/or otherwise operate in a normal, full-featured mode. One embodiment of a method for normal operation described above in connection with FIG. 7.

Referring back to block 822, if the battery level is not sufficient for normal operation, the method 800 branches to block 834. In block 834, the mobile computing device 100 determines whether the battery level is below the critical level. The mobile computing device 100 may determine, for example, whether the battery 126 is below a predefined charge level. If the battery level is below the critical level, the method 800 advances to block 836, in which the mobile computing device 100 disables the platform. The mobile computing device 100 may, for example, power down the platform or enter a charging mode. One embodiment of a method for disabling the platform is described above in connection with FIG. 6. Referring back to block 834, if the battery level is not below the critical level, the method 800 loops back to block 820 to continue monitoring the battery state in the MPS mode.

Figure 9:
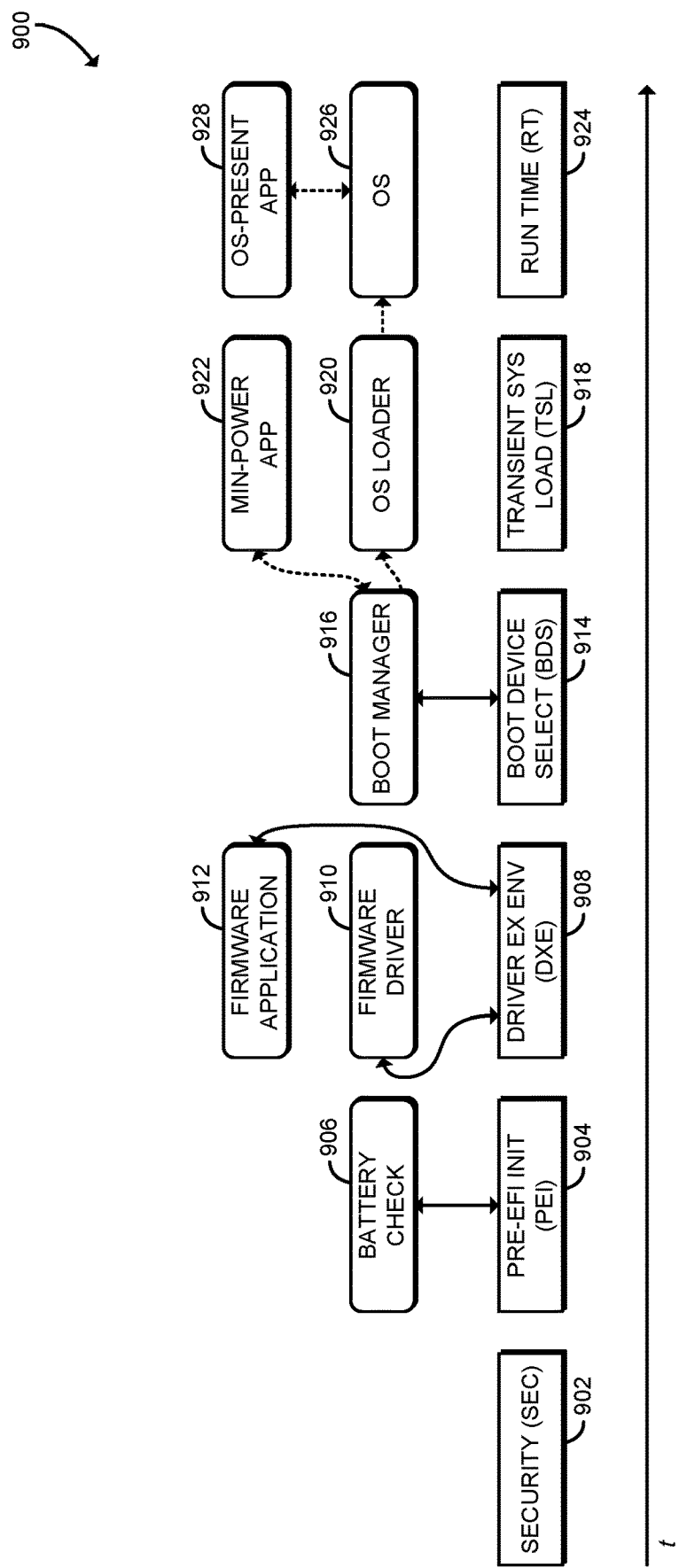
FIG. 9 is a simplified schematic diagram of at least one embodiment of a boot process according to the UEFI specification that may be executed by the computing device of FIGS. 1 and 2.

Referring now to FIG. 9, in use, the mobile computing device 100 may execute a boot process 900 compatible with the UEFI specification. As shown, the boot process 900 progresses in time through several phases. Each phase may execute one or more code modules, which may be embodied as drivers, applications, operating system loaders, or other executable images. The boot process 900 begins in the security (SEC) phase 902. The SEC phase 902 may be responsible for basic initialization of core components of the mobile computing device 100, such as the processor 120, and for establishing the platform root of trust. In some embodiments, the SEC phase 902 may initialize one or more components of the processor 120 and/or the mobile computing device 100 in a low-power state such as the D0i3 standby state.

In the pre-EFI initialization (PEI) phase 904, the mobile computing device 100 performs early device initialization, including initializing components required to execute the platform firmware environment 202, for example the memory 130 and the I/O subsystem 128. In the PEI phase 904, the mobile computing device 100 may execute one or more PEI modules responsible for particular initialization tasks. As shown, the PEI phase 904 may execute a battery check module 906, in which the mobile computing device 100 determines the battery state as described above in connection with the pre-boot battery check state 304 of FIG. 3 and/or the method 400 of FIG. 4.

In the driver execution environment (DXE) phase 908, the mobile computing device 100 loads and starts firmware images for one or more firmware drivers 910 or firmware applications 912. Firmware drivers 910 and applications 912 may be embodied as binary images that may be stored in a system partition or firmware volume of the data storage device 132. The particular drivers and applications to be loaded are platform-dependent and may be enumerated in global variables of the mobile computing device 100, for example, in a non-volatile memory store of the mobile computing device 100. The mobile computing device 100 may enumerate the firmware drivers 910 and applications 912 to be loaded and determine a required boot order. The boot order may be based on dependencies between the firmware drivers 910 and applications 912.

Firmware drivers 910 and applications 912 are essentially the same, except that applications 912 are generally unloaded from the memory 130 after returning from their entry point, and drivers 910 generally stay resident in the memory 130 unless they return with an error code. Firmware drivers 910 and applications 912 may initialize or control hardware of the mobile computing device 100. Firmware drivers 910 or applications 912 may also install firmware protocol interfaces, which define function call interfaces and, after being installed, allow other firmware images to invoke provided services. For example, one or more firmware drivers 910 or applications 912 may install variable services allowing client entities to get, set, and query firmware variable information.

In the boot device select (BDS) phase 914, the mobile computing device 100 executes a boot manager 916 to load one or more boot options based on the boot mode. A boot option may be embodied as a firmware application that will be loaded and started by the mobile computing device 100. Boot options may be embodied as operating system loaders or applications such as diagnostic, maintenance, or management applications. The particular boot option selected may be specified in global variables of the mobile computing device 100. As described above, the mobile computing device 100 may select a boot option based on whether booting in the normal boot mode or the minimum-power startup (MPS) boot mode.

In the transient system load (TSL) phase 918, the mobile computing device 100 executes the boot option selected in the BDS phase 914. The boot option may hand off control to an operating system and terminate boot services, for example by calling the UEFI function ExitBootServices( ). The boot option may also return to the BDS phase 914, allowing another boot option to be selected. As shown, the TSL phase 918 may execute an operating system loader 920, for example to start the operating system 204. In some embodiments, the TSL phase 918 may also execute a minimum-power application 922. The minimum-power application 922 may be embodied as a firmware application that provides functionality specified by the user for the MPS boot mode. For example, the minimum-power application 922 may be embodied as a basic phone app. After completing execution of the minimum-power application 922, the BDS phase 914 may pass control to the operating system loader 920.

In the runtime (RT) phase 924, an operating system 926 (e.g., the operating system 204) executes and has control of the mobile computing device 100. Only firmware services that have been specifically designated as runtime-capable may remain available after control has been passed to the operating system 204. The operating system 926 may execute one or more OS-present applications 928. In the normal boot mode, all features, devices, or other functionality of the mobile computing device 100 may be available to the OS-present applications 928. In the MPS boot mode, only user-selected features and devices may be available to the OS-present applications 928, and in some embodiments only user-selected OS-present applications 928 may be executed. For example, the OS-present application 928 may be embodied as a basic phone app that may be executed by the operating system 204 during the MPS boot mode.

Although the low-power startup mode is described above in relation to a mobile, computing device 100, it should be appreciated that the technologies described above may also be incorporated in a non-mobile or primarily stationary computing device. For example, the mobile computing device 100 may be embodied as desktop, a desktop computer, a workstation, a server computer, a distributed computing system, or other primarily stationary computing device that is typically connected to an AC power source.

EXAMPLES

Illustrative examples of the technologies disclosed herein are provided below. An embodiment of the technologies may include any one or more, and any combination of, the examples described below.

Example 1 includes a computing device for low-power booting, the computing device comprising a power management module to (i) initialize a plurality of components of the computing device in a low-power state and (ii) determine, in a pre-boot firmware environment, a battery state of the computing device; a minimum-power startup configuration module to (i) determine, in the pre-boot firmware environment, a minimum-power startup configuration, wherein the minimum-power startup configuration identifies one or more components of the plurality of components to energize in a minimum-power startup boot mode, and (ii) determine, in the pre-boot firmware environment, whether the battery state is sufficient for the minimum-power startup configuration; and a boot device selection module to boot the computing device in the minimum-power startup boot mode in response to a determination that the battery state is sufficient for the minimum-power startup configuration, wherein to boot in the minimum-power startup boot mode comprises to selectively energize the one or more components of the computing device based on the minimum-power startup configuration.

Example 2 includes the subject matter of Example 1, and wherein the one or more components of the computing device comprises a processor core, a graphics controller, a network controller, a radio, or a peripheral controller.

Example 3 includes the subject matter of any of Examples 1 and 2, and wherein to selectively energize the one or more components comprises to reduce an operating frequency of the one or more components or to reduce a dynamic power consumption of the one or more components.

Example 4 includes the subject matter of any of Examples 1-3, and wherein each component of the one or more components comprises a component of a processor of the computing device.

Example 5 includes the subject matter of any of Examples 1-4, and wherein to determine the minimum-power startup configuration comprises to read a firmware variable.

Example 6 includes the subject matter of any of Examples 1-5, and wherein the pre-boot firmware environment comprises a UEFI pre-EFI initialization (PEI) environment.

Example 7 includes the subject matter of any of Examples 1-6, and wherein the minimum-power startup configuration module is further to expose the minimum-power startup configuration to an operating system of the computing device.

Example 8 includes the subject matter of any of Examples 1-7, and wherein to boot in the minimum-power startup mode further comprises to selectively activate features of the operating system based on the minimum-power startup configuration.

Example 9 includes the subject matter of any of Examples 1-8, and wherein to boot in the minimum-power startup mode further comprises to start a user-specified application with functionality based on the minimum-power startup configuration.

Example 10 includes the subject matter of any of Examples 1-9, and wherein the power management module is further to determine a second battery level in response to booting in the minimum-power startup boot mode; the minimum-power startup configuration module is further to determine whether the second battery level is sufficient for normal boot; and the boot device selection module is further to energize a remainder of the plurality of components in response to a determination that the second battery level is sufficient for normal boot.

Example 11 includes the subject matter of any of Examples 1-10, and wherein to energize the remainder of the plurality of components comprises to energize the remainder of the plurality of components by an operating system of the computing device.

Example 12 includes the subject matter of any of Examples 1-11, and wherein to energize the remainder of the plurality of components comprises to energize the remainder of the plurality of components by a firmware driver of the computing device or a firmware application of the computing device.

Example 13 includes the subject matter of any of Examples 1-12, and wherein to energize the remainder of the plurality of components comprises to energize the remainder of the plurality of components by a system management mode firmware routine of the computing device.

Example 14 includes the subject matter of any of Examples 1-13, and wherein to energize the remainder of the plurality of components comprises to energize the remainder of the plurality of components by a power management controller of a processor of the computing device.

Example 15 includes the subject matter of any of Examples 1-14, and wherein the minimum-power startup configuration module is further to determine, in the pre-boot firmware environment, whether the battery state is sufficient for normal boot in response to a determination of the battery state; and the boot device selection module is further to boot in a normal boot mode in response to a determination that the battery state is sufficient for normal boot; wherein to determine the minimum-power startup configuration comprises to determine the minimum-power startup configuration in response to a determination the battery state is not sufficient for normal boot.

Example 16 includes the subject matter of any of Examples 1-15, and wherein to boot in the normal mode comprises to energize the plurality of components of the computing device.

Example 17 includes the subject matter of any of Examples 1-16, and further including a minimum-power startup management module to receive a user selection of a minimum-power startup boot mode feature in response to booting in the normal boot mode; and determine the minimum-power startup configuration as a function of the minimum-power startup boot mode feature.

Example 18 includes the subject matter of any of Examples 1-17, and wherein the minimum-power startup boot mode feature comprises a telephony feature, a messaging feature, a network feature, or a user-selected application.

Example 19 includes the subject matter of any of Examples 1-18, and wherein the minimum-power startup management module is further to save the minimum-power startup configuration as a firmware variable in response to determination of the minimum-power startup configuration.

Example 20 includes the subject matter of any of Examples 1-19, and further including a minimum-power startup management module to store a display image in response to booting in the normal boot mode; wherein to boot in the minimum-power startup boot mode comprises to display the stored display image.

Example 21 includes the subject matter of any of Examples 1-20, and further including a charging mode module to disable, in the pre-boot firmware environment, the computing device in response to a determination the battery state is not sufficient for the minimum-power startup configuration.

Example 22 includes the subject matter of any of Examples 1-21, and wherein to disable the computing device comprises to determine whether a battery of the computing device is charging; boot in a charging mode in response to a determination that the battery is charging, wherein the charging mode has limited interactive capability; and power down the computing device in response to a determination that the battery is not charging.

Example 23 includes a method for low-power booting, the method comprising initializing, by the computing device, a plurality of components of the computing device in a low-power state; determining, by the computing device in a pre-boot firmware environment, a battery state of the computing device; determining, by the computing device in the pre-boot firmware environment, a minimum-power startup configuration, wherein the minimum-power startup configuration identifies one or more components of the plurality of components to energize in a minimum-power startup boot mode; determining, by the computing device in the pre-boot firmware environment, whether the battery state is sufficient for the minimum-power startup configuration; and booting, by the computing device, in the minimum-power startup boot mode in response to determining that the battery state is sufficient for the minimum-power startup configuration, wherein booting in the minimum-power startup boot mode comprises selectively energizing the one or more components of the computing device based on the minimum-power startup configuration.

Example 24 includes the subject matter of Example 23, and wherein the one or more components of the computing device comprises a processor core, a graphics controller, a network controller, a radio, or a peripheral controller.

Example 25 includes the subject matter of any of Examples 23 and 24, and wherein selectively energizing the one or more components comprises reducing an operating frequency of the one or more components or reducing a dynamic power consumption of the one or more components.

Example 26 includes the subject matter of any of Examples 23-25, and wherein each component of the one or more components comprises a component of a processor of the computing device.

Example 27 includes the subject matter of any of Examples 23-26, and wherein determining the minimum-power startup configuration comprises reading a firmware variable.

Example 28 includes the subject matter of any of Examples 23-27, and wherein the pre-boot firmware environment comprises a UEFI pre-EFI initialization (PEI) environment.

Example 29 includes the subject matter of any of Examples 23-28, and further including exposing, by the computing device, the minimum-power startup configuration to an operating system of the computing device.

Example 30 includes the subject matter of any of Examples 23-29, and wherein booting in the minimum-power startup mode further comprises selectively activating features of the operating system based on the minimum-power startup configuration.

Example 31 includes the subject matter of any of Examples 23-30, and wherein booting in the minimum-power startup mode further comprises starting a user-specified application with functionality based on the minimum-power startup configuration.

Example 32 includes the subject matter of any of Examples 23-31, and further including determining, by the computing device, a second battery level in response to booting in the minimum-power startup boot mode; determining, by the computing device, whether the second battery level is sufficient for normal boot; and energizing, by the computing device, a remainder of the plurality of components in response to determining the second battery level is sufficient for normal boot.

Example 33 includes the subject matter of any of Examples 23-32, and wherein energizing the remainder of the plurality of components comprises energizing the remainder of the plurality of components by an operating system of the computing device.

Example 34 includes the subject matter of any of Examples 23-33, and wherein energizing the remainder of the plurality of components comprises energizing the remainder of the plurality of components by a firmware driver of the computing device or a firmware application of the computing device.

Example 35 includes the subject matter of any of Examples 23-34, and wherein energizing the remainder of the plurality of components comprises energizing the remainder of the plurality of components by a system management mode firmware routine of the computing device.

Example 36 includes the subject matter of any of Examples 23-35, and wherein energizing the remainder of the plurality of components comprises energizing the remainder of the plurality of components by a power management controller of a processor of the computing device.

Example 37 includes the subject matter of any of Examples 23-36, and further including determining, by the computing device in the pre-boot firmware environment, whether the battery state is sufficient for normal boot in response to determining the battery state; and booting, by the computing device, in a normal boot mode in response to determining the battery state is sufficient for normal boot; wherein determining the minimum-power startup configuration comprises determining the minimum-power startup configuration in response to determining the battery state is not sufficient for normal boot.

Example 38 includes the subject matter of any of Examples 23-37, and wherein booting in the normal mode comprises energizing the plurality of components of the computing device.

Example 39 includes the subject matter of any of Examples 23-38, and further including receiving, by the computing device, a user selection of a minimum-power startup boot mode feature in response to booting in the normal boot mode; and determining, by the computing device, the minimum-power startup configuration as a function of the minimum-power startup boot mode feature.

Example 40 includes the subject matter of any of Examples 23-39, and wherein the minimum-power startup boot mode feature comprises a telephony feature, a messaging feature, a network feature, or a user-selected application.

Example 41 includes the subject matter of any of Examples 23-40, and further including saving the minimum-power startup configuration as a firmware variable in response to determining the minimum-power startup configuration.

Example 42 includes the subject matter of any of Examples 23-41, and further including storing, by the computing device, a display image in response to booting in the normal boot mode; wherein booting in the minimum-power startup boot mode comprises displaying the stored display image.

Example 43 includes the subject matter of any of Examples 23-42, and further including disabling, by the computing device in the pre-boot firmware environment, the computing device in response to determining the battery state is not sufficient for the minimum-power startup configuration.

Example 44 includes the subject matter of any of Examples 23-43, and wherein disabling the computing device comprises determining whether a battery of the computing device is charging; booting in a charging mode in response to determining the battery is charging, wherein the charging mode has limited interactive capability; and powering down the computing device in response to determining the battery is not charging.

Example 45 includes a computing device comprising a processor; and a memory having stored therein a plurality of instructions that when executed by the processor cause the computing device to perform the method of any of Examples 23-44.

Example 46 includes one or more machine readable storage media comprising a plurality of instructions stored thereon that in response to being executed result in a computing device performing the method of any of Examples 23-44.

Example 47 includes a computing device comprising means for performing the method of any of Examples 23-44.

Example 48 includes a computing device for low-power booting, the computing device comprising means for initializing a plurality of components of the computing device in a low-power state; means for determining, in a pre-boot firmware environment, a battery state of the computing device; means for determining, in the pre-boot firmware environment, a minimum-power startup configuration, wherein the minimum-power startup configuration identifies one or more components of the plurality of components to energize in a minimum-power startup boot mode; means for determining, in the pre-boot firmware environment, whether the battery state is sufficient for the minimum-power startup configuration; and means for booting in the minimum-power startup boot mode in response to determining that the battery state is sufficient for the minimum-power startup configuration, wherein the means for booting in the minimum-power startup boot mode comprises means for selectively energizing the one or more components of the computing device based on the minimum-power startup configuration.

Example 49 includes the subject matter of Example 48, and wherein the one or more components of the computing device comprises a processor core, a graphics controller, a network controller, a radio, or a peripheral controller.

Example 50 includes the subject matter of any of Examples 48 and 49, and wherein the means for selectively energizing the one or more components comprises means for reducing an operating frequency of the one or more components or means for reducing a dynamic power consumption of the one or more components.

Example 51 includes the subject matter of any of Examples 48-50, and wherein each component of the one or more components comprises a component of a processor of the computing device.

Example 52 includes the subject matter of any of Examples 48-51, and wherein the means for determining the minimum-power startup configuration comprises means for reading a firmware variable.

Example 53 includes the subject matter of any of Examples 48-52, and wherein the pre-boot firmware environment comprises a UEFI pre-EFI initialization (PEI) environment.

Example 54 includes the subject matter of any of Examples 48-53, and further including means for exposing the minimum-power startup configuration to an operating system of the computing device.

Example 55 includes the subject matter of any of Examples 48-54, and wherein the means for booting in the minimum-power startup mode further comprises means for selectively activating features of the operating system based on the minimum-power startup configuration.

Example 56 includes the subject matter of any of Examples 48-55, and wherein the means for booting in the minimum-power startup mode further comprises means for starting a user-specified application with functionality based on the minimum-power startup configuration.

Example 57 includes the subject matter of any of Examples 48-56, and further including means for determining a second battery level in response to booting in the minimum-power startup boot mode; means for determining whether the second battery level is sufficient for normal boot; and means for energizing a remainder of the plurality of components in response to determining the second battery level is sufficient for normal boot.

Example 58 includes the subject matter of any of Examples 48-57, and wherein the means for energizing the remainder of the plurality of components comprises means for energizing the remainder of the plurality of components by an operating system of the computing device.

Example 59 includes the subject matter of any of Examples 48-58, and wherein the means for energizing the remainder of the plurality of components comprises means for energizing the remainder of the plurality of components by a firmware driver of the computing device or a firmware application of the computing device.

Example 60 includes the subject matter of any of Examples 48-59, and wherein the means for energizing the remainder of the plurality of components comprises means for energizing the remainder of the plurality of components by a system management mode firmware routine of the computing device.

Example 61 includes the subject matter of any of Examples 48-60, and wherein the means for energizing the remainder of the plurality of components comprises means for energizing the remainder of the plurality of components by a power management controller of a processor of the computing device.

Example 62 includes the subject matter of any of Examples 48-61, and further including means for determining, in the pre-boot firmware environment, whether the battery state is sufficient for normal boot in response to determining the battery state; and means for booting in a normal boot mode in response to determining the battery state is sufficient for normal boot; wherein the means for determining the minimum-power startup configuration comprises means for determining the minimum-power startup configuration in response to determining the battery state is not sufficient for normal boot.

Example 63 includes the subject matter of any of Examples 48-62, and wherein the means for booting in the normal mode comprises means for energizing the plurality of components of the computing device.

Example 64 includes the subject matter of any of Examples 48-63, and further including means for receiving a user selection of a minimum-power startup boot mode feature in response to booting in the normal boot mode; and means for determining the minimum-power startup configuration as a function of the minimum-power startup boot mode feature.

Example 65 includes the subject matter of any of Examples 48-64, and wherein the minimum-power startup boot mode feature comprises a telephony feature, a messaging feature, a network feature, or a user-selected application.

Example 66 includes the subject matter of any of Examples 48-65, and further including means for saving the minimum-power startup configuration as a firmware variable in response to determining the minimum-power startup configuration.

Example 67 includes the subject matter of any of Examples 48-66, and further including means for storing a display image in response to booting in the normal boot mode; wherein the means for booting in the minimum-power startup boot mode comprises means for displaying the stored display image.

Example 68 includes the subject matter of any of Examples 48-67, and further including means for disabling, in the pre-boot firmware environment, the computing device in response to determining the battery state is not sufficient for the minimum-power startup configuration.

Example 69 includes the subject matter of any of Examples 48-68, and wherein the means for disabling the computing device comprises means for determining whether a battery of the computing device is charging; means for booting in a charging mode in response to determining the battery is charging, wherein the charging mode has limited interactive capability; and means for powering down the computing device in response to determining the battery is not charging.

The invention claimed is:

1. A computing device for low-power booting, the computing device comprising:
   a minimum-power startup configuration module to determine, in a pre-boot firmware environment, a minimum-power startup configuration, wherein the minimum-power startup configuration identifies a first group of components of the computing device to energize in a minimum-power startup boot mode;
   a boot device selection module to boot the computing device in the minimum-power startup boot mode, wherein to boot in the minimum-power startup boot mode comprises to selectively energize the first group of components of the computing device based on the minimum-power startup configuration; and
   a power management module to determine a battery level in response to booting in the minimum-power startup boot mode;
   wherein the minimum-power startup configuration module is further to determine whether the battery level is sufficient for normal boot; and
   wherein the boot device selection module is further to energize a second group of components of the computing device without an intervening reboot subsequent to booting in the minimum-power startup boot mode in response to a determination the second battery level is sufficient for normal boot, wherein the second group of components does not include the first group of components.

2. The computing device of claim 1, wherein each component of the first group of components comprises a component of a processor of the computing device.

3. The computing device of claim 1, wherein the minimum-power startup configuration module is further to expose the minimum-power startup configuration to an operating system of the computing device.

4. The computing device of claim 3, wherein to boot in the minimum-power startup mode further comprises to selectively activate features of the operating system based on the minimum-power startup configuration.

5. The computing device of claim 1, wherein to boot in the minimum-power startup mode further comprises to start a user-specified application with functionality based on the minimum-power startup configuration.

6. The computing device of claim 1, wherein to energize the second group of components comprises to energize the second group of components by an operating system of the computing device.

7. The computing device of claim 1, wherein to energize the second group of components comprises to energize the second group of components by a firmware driver of the computing device or a firmware application of the computing device.

8. The computing device of claim 1, wherein to energize the second group of components comprises to energize the second group of components by a system management mode firmware routine of the computing device.

9. The computing device of claim 1, wherein to energize the second group of components comprises to energize the second group of components by a power management controller of a processor of the computing device.

10. The computing device of claim 1, wherein:
    the boot device selection module is further to boot in a normal boot mode in response to an energization of the second group of components.

11. The computing device of claim 10, further comprising a minimum-power startup management module to:
    receive a user selection of a minimum-power startup boot mode feature in response to booting in the normal boot mode; and
    determine the minimum-power startup configuration as a function of the minimum-power startup boot mode feature.

12. The computing device of claim 1, further including a charging mode module, wherein:
    the minimum-power startup configuration module is further to determine, in the pre-boot firmware environment, whether a battery state of the computing device is sufficient for the minimum-power startup configuration; and
    the charging mode module is to disable, in the pre-boot firmware environment, the computing device in response to a determination that the battery state is not sufficient for the minimum-power startup configuration.

13. The computing device of claim 12, wherein to disable the computing device comprises to:
    determine whether a battery of the computing device is charging;
    boot in a charging mode in response to a determination that the battery is charging, wherein the charging mode has limited interactive capability; and
    power down the computing device in response to a determination that the battery is not charging.

14. A method for low-power booting, the method comprising:
    determining, by a computing device in a pre-boot firmware environment, a minimum-power startup configuration, wherein the minimum-power startup configuration identifies a first group of components of the computing device to energize in a minimum-power startup boot mode;

booting, by the computing device, in the minimum-power startup boot mode, wherein booting in the minimum-power startup boot mode comprises selectively energizing the first group of components of the computing device based on the minimum-power startup configuration;

determining, by the computing device, a battery level in response to booting in the minimum-power startup boot mode;

determining, by the computing device, whether the battery level is sufficient for normal boot; and energizing, by the computing device, a second group of components of the computing device without an intervening reboot subsequent to booting in the minimum-power startup boot mode in response to determining the second battery level is sufficient for normal boot, wherein the second group of components does not include the first group of components.

15. The method of claim 14, further comprising exposing, by the computing device, the minimum-power startup configuration to an operating system of the computing device.

16. The method of claim 14, wherein booting in the minimum-power startup mode further comprises starting a user-specified application with functionality based on the minimum-power startup configuration.

17. The method of claim 14, further comprising:
booting, by the computing device, in a normal boot mode in response to energizing the second group of components.

18. The method of claim 17, further comprising:
receiving, by the computing device, a user selection of a minimum-power startup boot mode feature in response to booting in the normal boot mode; and determining, by the computing device, the minimum-power startup configuration as a function of the minimum-power startup boot mode feature.

19. One or more non-transitory, computer-readable storage media comprising a plurality of instructions that in response to being executed cause a computing device to:

determine, in a pre-boot firmware environment, a minimum-power startup configuration, wherein the minimum-power startup configuration identifies a first group of components of the computing device to energize in a minimum-power startup boot mode;

boot in the minimum-power startup boot mode, wherein to boot in the minimum-power startup boot mode comprises to selectively energize the first group of components of the computing device based on the minimum-power startup configuration;

determine a battery level in response to booting in the minimum-power startup boot mode;

determine whether the battery level is sufficient for normal boot; and energize a second group of components of the computing device without an intervening reboot subsequent to booting in the minimum-power startup boot mode in response to determining the second battery level is sufficient for normal boot, wherein the second group of components does not include the first group of components.

20. The one or more non-transitory, computer-readable storage media of claim 19, further comprising a plurality of instructions that in response to being executed cause the computing device to expose the minimum-power startup configuration to an operating system of the computing device.

* * * * *